(12) United States Patent
Caskey et al.

(10) Patent No.: US 9,077,813 B2
(45) Date of Patent: Jul. 7, 2015

(54) MASKING MOBILE MESSAGE CONTENT

(75) Inventors: Sasha P. Caskey, New York, NY (US); Ossama Emam, Giza (EG); Dimitri Kanevsky, Ossining, NY (US); Tara N. Sainath, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 13/408,044

(22) Filed: Feb. 29, 2012

(65) Prior Publication Data

US 2013/0227701 A1    Aug. 29, 2013

(51) Int. Cl.
*H04M 1/725*    (2006.01)
*G06F 21/60*    (2013.01)
*G06F 21/00*    (2013.01)
*G06F 21/10*    (2013.01)

(52) U.S. Cl.
CPC ............. *H04M 1/7255* (2013.01); *G06F 21/60* (2013.01); *G06F 21/00* (2013.01); *G06F 21/10* (2013.01); *H04M 1/72552* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,107,443 | A * | 4/1992 | Smith et al. | 715/751 |
| 5,493,692 | A * | 2/1996 | Theimer et al. | 455/26.1 |
| 5,991,719 | A | 11/1999 | Yazaki et al. | |
| 6,356,937 | B1 | 3/2002 | Montville et al. | |
| 6,466,232 | B1 * | 10/2002 | Newell et al. | 715/700 |
| 7,454,351 | B2 | 11/2008 | Jeschke et al. | |
| 7,464,090 | B2 | 12/2008 | Betz | |
| 7,511,682 | B2 * | 3/2009 | Fuller et al. | 345/1.1 |
| 7,512,889 | B2 * | 3/2009 | Newell et al. | 715/741 |
| 7,685,238 | B2 * | 3/2010 | Etelapera | 709/205 |
| 8,423,563 | B2 * | 4/2013 | McPeake et al. | 707/758 |
| 8,452,345 | B2 * | 5/2013 | Lee et al. | 455/567 |
| 2001/0044785 | A1 * | 11/2001 | Stolfo et al. | 705/74 |
| 2002/0084721 | A1 | 7/2002 | Walczak | |
| 2002/0177471 | A1 * | 11/2002 | Kaaresoja et al. | 455/567 |

(Continued)

FOREIGN PATENT DOCUMENTS

| | | |
|---|---|---|
| CN | 1561129 A | 1/2005 |
| CN | 101252748 A | 8/2008 |
| CN | 101681620 A | 3/2010 |

OTHER PUBLICATIONS

Berger (Berger et al., Using Symbiotic Displays to Views Sensitive Information in Public, IEEE International Conference on Pervasive Computing and Communications (PerCom'05). Kauai Island, Hawaii. 2005).*

(Continued)

*Primary Examiner* — Peter Poltorak
(74) *Attorney, Agent, or Firm* — Ryan, Mason & Lewis, LLP (57) ABSTRACT

A method, an apparatus and an article of manufacture for masking a message on an electronic device. The method includes receiving a message on an electronic device, determining if a message category label is included in the message, mapping the message category to a corresponding masking format if a message category label is included in the message, extracting the content of the message to generate a message category if a message category label is not included in the message, wherein each message category generated corresponds to a masking format, and masking the message on the electronic device by transforming the message into the masking format that corresponds to the message category for the message.

21 Claims, 6 Drawing Sheets

(56) References Cited

U.S. PATENT DOCUMENTS

| | | | |
|---|---|---|---|
| 2002/0178000 A1* | 11/2002 | Aktas et al. | 704/235 |
| 2003/0033347 A1 | 2/2003 | Bolle et al. | |
| 2003/0108189 A1 | 6/2003 | Barzani | |
| 2004/0038186 A1 | 2/2004 | Martin et al. | |
| 2004/0078596 A1* | 4/2004 | Kent et al. | 713/201 |
| 2004/0189484 A1* | 9/2004 | Li | 340/825.19 |
| 2004/0213401 A1* | 10/2004 | Aupperle et al. | 379/372 |
| 2005/0031106 A1* | 2/2005 | Henderson | 379/142.17 |
| 2007/0175974 A1* | 8/2007 | Self et al. | 235/375 |
| 2007/0176742 A1 | 8/2007 | Hofmann et al. | |
| 2007/0232274 A1* | 10/2007 | Jung et al. | 455/412.1 |
| 2007/0249379 A1* | 10/2007 | Bantukul | 455/466 |
| 2007/0264969 A1* | 11/2007 | Frank et al. | 455/404.2 |
| 2007/0271608 A1* | 11/2007 | Shimizu et al. | 726/17 |
| 2008/0218490 A1* | 9/2008 | Kim et al. | 345/173 |
| 2008/0282356 A1* | 11/2008 | Grabarnik et al. | 726/26 |
| 2009/0049142 A1* | 2/2009 | Jones et al. | 709/206 |
| 2009/0240497 A1 | 9/2009 | Usher et al. | |
| 2009/0249475 A1* | 10/2009 | Ohaka | 726/16 |
| 2010/0067695 A1* | 3/2010 | Liao et al. | 380/255 |
| 2010/0105426 A1 | 4/2010 | Jaiswal et al. | |
| 2010/0183128 A1 | 7/2010 | Logan et al. | |
| 2010/0275266 A1* | 10/2010 | Jakobson et al. | 726/26 |
| 2011/0018696 A1 | 1/2011 | Ryu et al. | |
| 2011/0169622 A1* | 7/2011 | Billmaier et al. | 340/407.1 |
| 2013/0182126 A1* | 7/2013 | Watanabe et al. | 348/207.1 |
| 2014/0172557 A1* | 6/2014 | Eden et al. | 705/14.49 |
| 2014/0370817 A1* | 12/2014 | Luna | 455/41.3 |

OTHER PUBLICATIONS

S.J. Ross, et al., "A Composable Framework for Secure Multi-Modal Access to Internet Services from Post-PC Devices," in 3rd IEEE Workshop on Mobile Computing Systems and Applications WMCSA'00, Monterey, California, 2000.*

Suleman, IBM Showcases Morning Report Aggregation App, http://www.v3.co.uk/v3-uk/news/2030876/ibm-showcases-moning-report-aggregations-app, Feb. 2, 2011, pp. 1-2.

iPhone Secure Data and Photo Encryption Apps, http://www.softwareops.com, downloaded Apr. 30, 2012, pp. 1-2.

Cellcrypt Encrypts Voice Calls on Leading Smartphones, Cellcrypt Voice Security Solutions, http://www.cellcrypt.com/ downloaded Apr. 30, 2012, pp. 1-2.

Videomask, for iPhone and iPod Touch, http://www.videomask.co.uk/ downloaded Apr. 30, 2012, pp. 1-1.

SpoofApp: Caller ID Spoofing for Your Mobile Phone, http://spoofapp.com/ downloaded Apr. 30, 2012, pp. 1-1.

tf*idf, Wikipedia, http://en.wikipedia.org/wiki/Tf*idf, downloaded Apr. 30, 2012, pp. 1-2.

* cited by examiner

MASKING MOBILE MESSAGE CONTENT

FIELD OF THE INVENTION

Embodiments of the invention generally relate to information technology, and, more particularly, to mobile communications.

BACKGROUND

In many situations, users cannot look at or into cell phone or email messages (text or audio) because they are in a meeting or surrounded by other people who may see text or overhear an audio message. To address this issue, existing approaches include the use of steganography; that is, writing hidden messages in such a way that no one, apart from the sender and intended recipient, suspects the existence of the message. Steganography can be applied to different types of media including text, audio, image and video. However, text steganography presents challenges due to lack of redundancy in text as compared to image or audio, but it also includes smaller memory occupation and simpler communication.

Data compression can be used to encode information in one representation into another representation, with the new representation of data being smaller in size. Existing data compression approaches include Huffman coding, which assigns smaller length code-words to more frequently occurring source symbols and longer length code-words to less frequently occurring source symbols. However, a need exists for masking information based on the sensitivity of the data.

SUMMARY

In one aspect of the present invention, techniques for masking mobile message content are provided. An exemplary computer-implemented method for masking a message on an electronic device can include steps of receiving a message on an electronic device, determining if a message category label is included in the message, mapping the message category to a corresponding masking format if a message category label is included in the message, extracting the content of the message to generate a message category if a message category label is not included in the message, wherein each message category generated corresponds to a masking format, and masking the message on the electronic device by transforming the message into the masking format that corresponds to the message category for the message.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes masking mobile or cell phone message content. An example embodiment of the invention includes representing messages in a masked manner that is understood by an owner of a device (for example, a cell phone or laptop) but could not be accessible by someone else. The techniques detailed herein include, for example, hiding one set of data or signals within another signal or carrier in such a way that its presence is virtually imperceptible to the end recipient as well as the originator of the carrier signal. Accordingly, an aspect of the invention includes transforming short messages, emails, voice messages, etc. to forms that are only readable/understandable by the recipient.

Production of categorized masked messages, in accordance with at least one embodiment of the invention, can be carried out automatically using speech recognition technologies coupled with machine learning systems to categorize message content. Categories can include, by way of example, vibration, transformed sound and transformed graphics.

Accordingly, a category of messages can be represented via a vibration type. For instance, a small number of categories can be selected, such as urgent, sad news from family, good news from someone, etc. People have an ability to learn to recognize multiple different vibration types. Therefore multiple categories of messages can be sent to a user via vibration, and the user can then decide if he or she wants to move to some location where they can display a full message in a secured way or can choose to do this at a later time (based on the type of vibration and corresponding message category, for example).

As also noted above, a category of messages can be represented via a transformed sound. Users can plausibly memorize multiple classes of sounds to represent various categories. Additionally, even if a separate individual overhears these sounds, the user alone will now know what types of message content correspond to the sound(s).

Further, transformed graphics can be used to represent categories. Users plausibly possess memory for symbols and can often associate feelings and memories thereto. Accordingly, in at least one embodiment of the invention, message categories can be encoded using different symbols (letters, pictures, drawings, etc.) which would allow the user to understand the category of the message without others being able to decode the same.

As also described herein, an aspect of the invention includes using speech recognition technology that is trained to understand masked voice messages from a cell phone and transcribe the message. The transcription can be displayed on a different terminal that is accessible and viewed only by the user of the cell phone.

Figure 1:
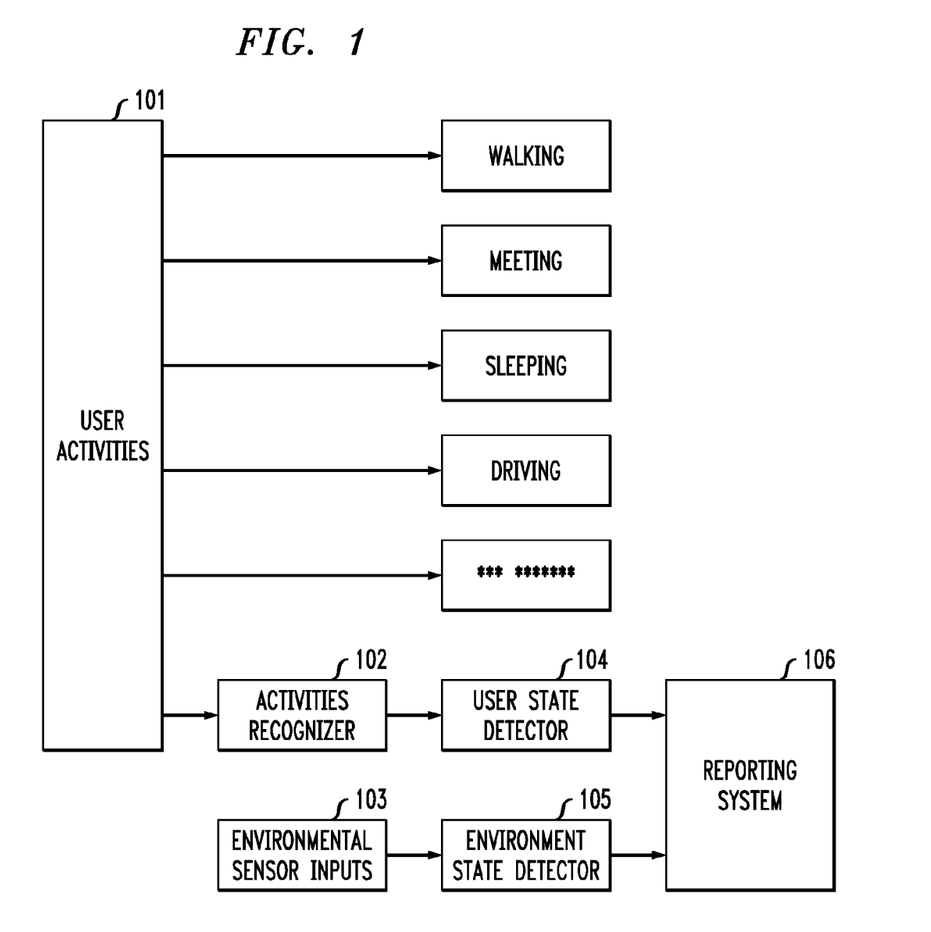
FIG. 1 is a diagram illustrating example system components, according to an embodiment of the present invention.

FIG. 1 is a diagram illustrating example system components, according to an embodiment of the present invention. By way of illustration, FIG. 1 depicts user activities 101 monitored via an activity recognizer module 102, which identifies a full array of user behavior/activities such as walking, driving, meeting, sleeping, etc. The activities recognizer module 102 provides input to a user state detector module 104 in order to determine a user state. Also, environmental sensor inputs 103 (surrounding people, etc.) are used by an environment state detector module 105 to determine a privacy status of the user. The user state and the environment state/privacy status are feed to a reporting system module 106 that determines how messages will be transformed.

The decision of the reporting system can also be changed by the user. The implementation of the reporting system module 106 in dealing with a user (feedback system) can use the capabilities of the modern machine-learning tools such as Reinforcement Learning (RL).

An example embodiment of the invention can include a distributed system such as depicted in FIG. 1 with sensors and reporting parts residing in a client and the processing carried out in servers residing in a cloud. In such an embodiment, the environmental sensors 103 and the reporting module 106 could reside in the client device, though the reports could also be prepared by servers and displayed by the client. The processing in such an embodiment can be performed on the servers and include the activities recognizer module 102, the user state detector module 104 and the environment state detector module 105.

Figure 2:
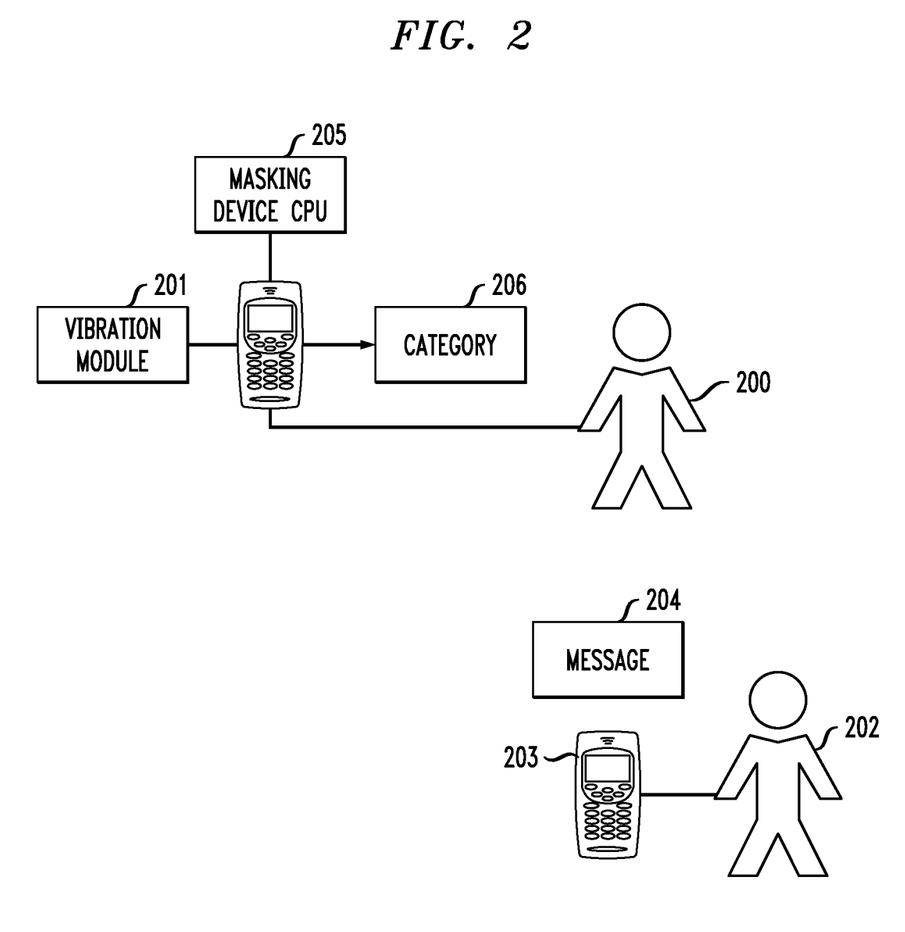
FIG. 2 is a diagram illustrating example components, according to an embodiment of the present invention.

FIG. 2 is a diagram illustrating example components, according to an embodiment of the present invention. By way of illustration, FIG. 2 depicts users 200 and 202 with cell phones 201 and 203, respectively. Specifically, components 201 represent the cell phone and vibration module of user 200. The vibration module maps the category of message into a particular vibration pattern. Component 203 represents the cell phone of user 202.

As also depicted in FIG. 2, message 204 is sent from user 202. An audio message can be recorded in a cell phone or parlayed in real-time. A central processing unit (CPU) with a masking device 205 resides inside cell phone 201, and a category device 206 identifies the category of message 204 for user 200.

Figure 3:
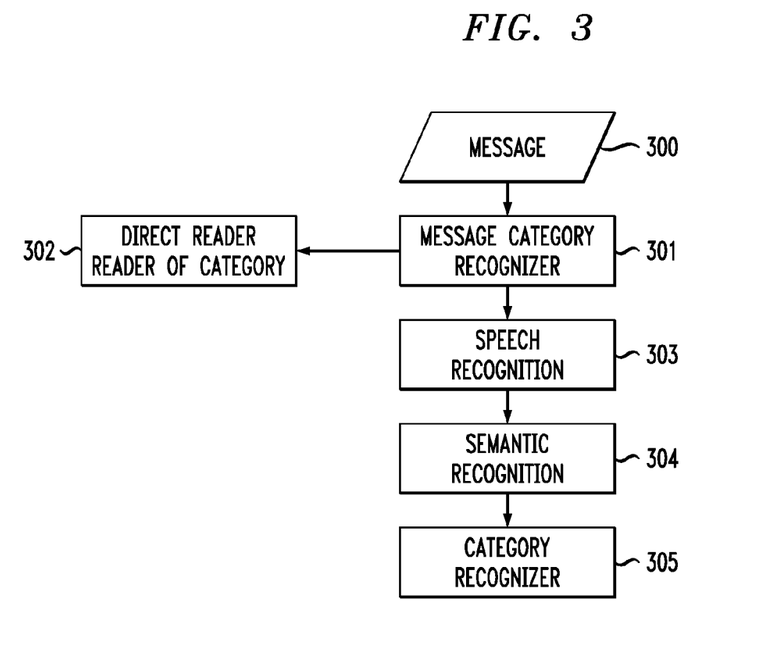
FIG. 3 is a diagram illustrating steps carried out by a masking device, according to an embodiment of the present invention.

FIG. 3 is a diagram illustrating steps carried out by a masking device (such as component 205 in FIG. 2), according to an embodiment of the present invention. Step 300 includes the masking device receiving a message and sending it to a message category recognizer module. Step 301 includes the message category recognizer module determining if categories are already present. If yes (that is, the category is present), the message is sent to a direct reader of category module. Step 302 includes the direct reader module recognizing the category.

If the determination made in step 301 is that categories are not present, step 303 includes extracting the content of the message. In the example of FIG. 3, this step is carried out using speech recognition and the content is then sent to a semantic recognition module. Step 304 includes the semantic recognizer module analyzes the content, producing semantics to be used by a category recognizer module to generate a category. Accordingly, step 305 includes the category recognizer module reading a semantic description of the message and mapping the description into a category.

Category mapping/generation of a message (for example, SAD, URGENT, HOME NEWS, CALL_HOME, MAKE_SHOPPING, etc.) can be carried out using multiple known methods. By way of example, speech dialogue can be interpreted as commands, and a corpus of text messages can be labeled with labels that represent categories. A system of labeled corpora of text messages can be used to identify how to label new messages. Additionally, new messages can be labeled as messages most similar to already labeled sentences in a corpus. Metrics for similarity of sentences can be defined, for example, via term frequency-inverse document frequency that can help to identify essential key words in sentences. These key words (such as BUY, CALL HOME, etc.) can help to label sentences and define a category.

Figure 4:
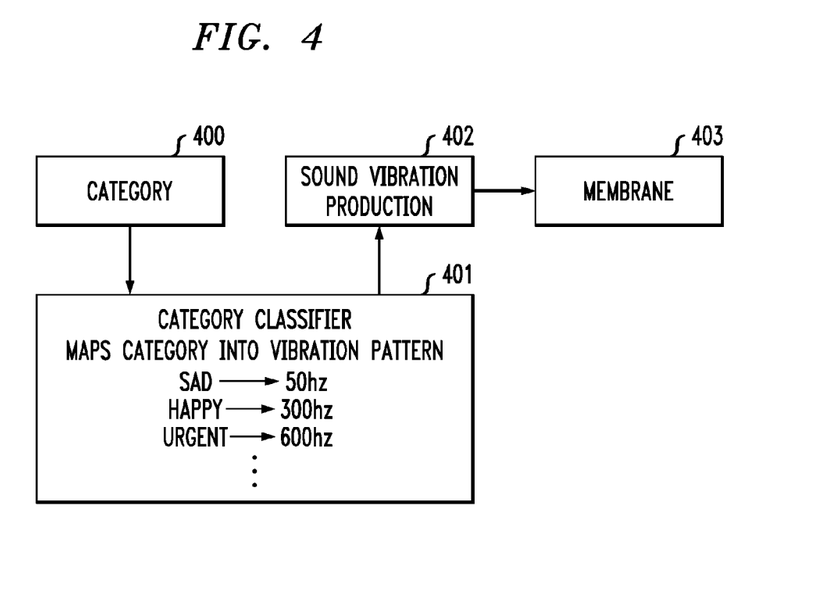
FIG. 4 is a diagram illustrating steps carried out by a vibration module, according to an embodiment of the present invention.

FIG. 4 is a diagram illustrating steps carried out by a vibration module (such as component 201 in FIG. 2), according to an embodiment of the present invention. Step 400 includes receiving a category from a user cell phone and sending the category to a category classifier module for interpretation. Step 401 includes the category classifier module mapping the category to specific patterns. By way merely of example, an urgent message category could map to a 50 hertz (Hz) vibration.

Step 402 includes transforming the patterns into sound and/or vibration production information and sending the production output to a membrane component. A membrane component provides tactile feedback to a user. Different frequencies can be applied to a membrane element to provide, to a user, different tactile stimuli. Step 403 includes generating a sound and/or vibration from the generated production information.

Figure 5:
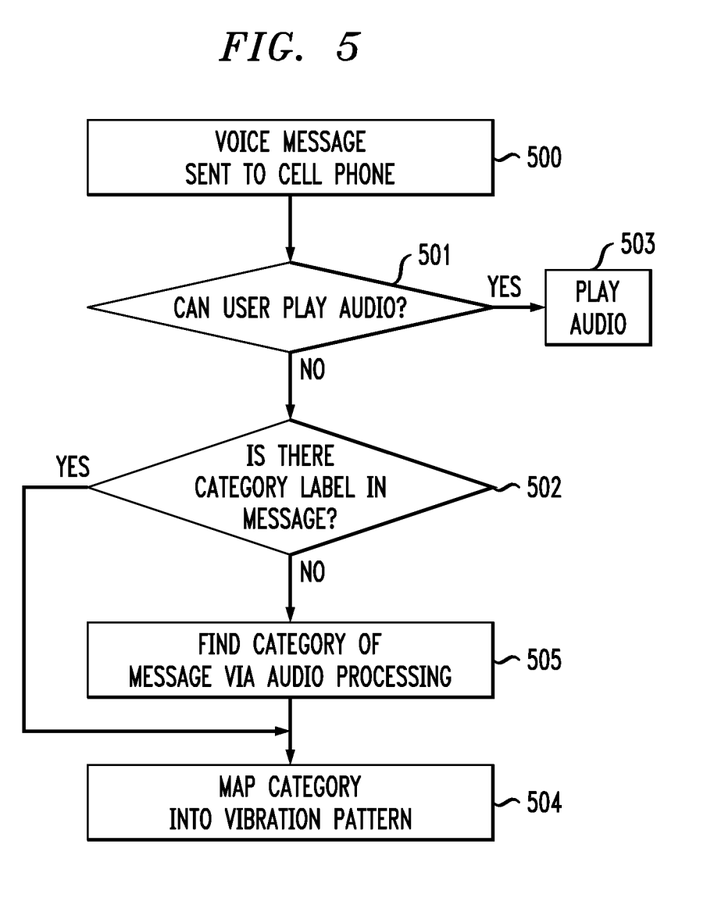
FIG. 5 is a flow diagram illustrating an example embodiment of the present invention.

FIG. 5 is a flow diagram illustrating an example embodiment of the present invention. Step 500 includes sending a voice message to a cell phone of a user. Step 501 includes determining if the user cell phone can play audio. If the user cell phone can play audio, step 503 includes playing the audio. If the user cell phone cannot play audio, step 502 includes determining if there is a category label in the message. If there is a category label in the message, step 504 includes mapping the category into a vibration pattern (or a sound or graphic manifestation). If there is not is a category label in the message, step 505 includes finding a category of messaging via audio processing. This step can be carried out, for example, as detailed in step 305 above. This step also can be carried out using voice biometrics to define user mood (SAD, HAPPY, WORRIED, etc.).

Figure 6:
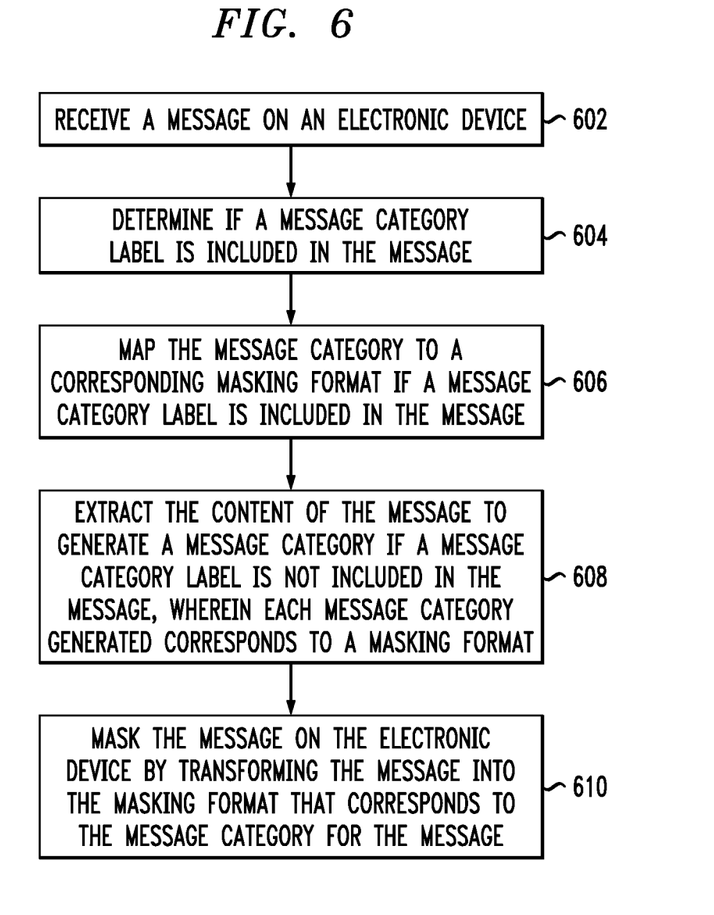
FIG. 6 is a flow diagram illustrating techniques for masking a message on an electronic device, according to an embodiment of the invention.

FIG. 6 is a flow diagram illustrating techniques for masking a message on an electronic device, according to an embodiment of the present invention. Step 602 includes receiving a message on an electronic device. The message can include a text message, an email, a voice message, etc.

Step 604 includes determining if a message category label is included in the message. Step 606 includes mapping the message category to a corresponding masking format if a message category label is included in the message.

Step 608 includes extracting the content of the message to generate a message category if a message category label is not included in the message, wherein each message category generated corresponds to a masking format. The masking format can include one or more of vibration, sound and a graphic symbol. Extracting the content of the message to generate a message can include analyzing (for example, using speech recognition) the content to produce semantics pertaining to the message, and using the semantics to generate a category for the message. Using the semantics to generate a category for the message can include reading a semantic description of the message and mapping the description into a category.

Step 610 includes masking the message on the electronic device by transforming the message into the masking format that corresponds to the message category for the message. Masking the message on the electronic device by transforming the message into the masking format that corresponds to the message category for the message can further include sending the masking format to a device membrane component and generating a manifestation according to the masking format for the message.

The techniques depicted in FIG. 6 can also include creating a vocabulary for the masking format, and associating each component of the vocabulary with a different message category. Additionally, in at least one embodiment of the invention, a message sender defines a message category for the message. Also, a user can be enabled to change a masking format that corresponds to the message category for the message.

Additionally, the techniques depicted in FIG. 6 can include monitoring user activity to determine a user state, monitoring environmental information to determine a privacy status of the user, and determining how a message is to be transformed based on the user state and the privacy status.

The techniques depicted in FIG. 6 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules detailed herein can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 7:
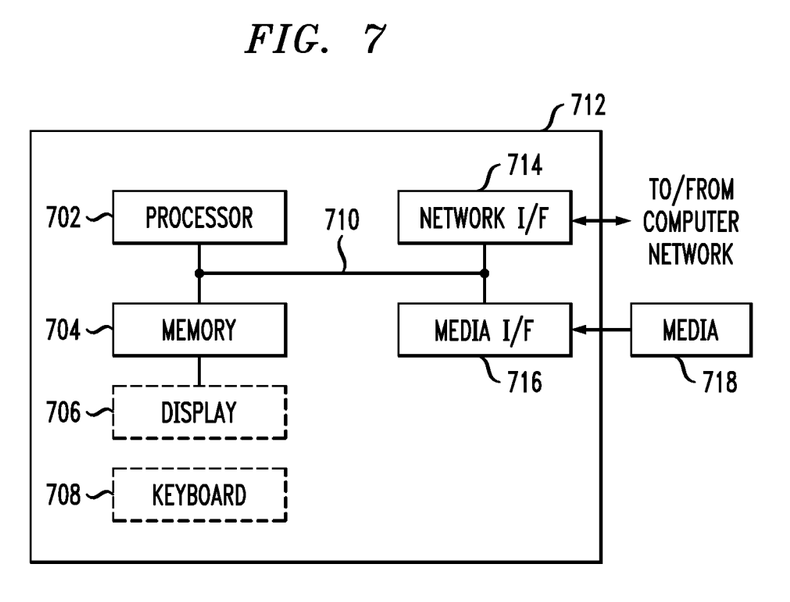
FIG. 7 is a system diagram of an exemplary computer system on which at least one embodiment of the invention can be implemented.

Additionally, an aspect of the present invention can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As noted, aspects of the present invention may take the form of a computer program product embodied in a computer readable medium having computer readable program code embodied thereon. Also, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, automatic production of categorized masked messages using speech recognition technologies coupled with machine learning systems to categorize message content.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for masking a message on an electronic device, wherein the method comprises:
   receiving a message on an electronic device;
   determining if a message category label is included in the message;
   mapping the message category to a corresponding masking format if a message category label is included in the message;
   extracting the content of the message to generate a message category if a message category label is not included in the message, wherein each message category generated corresponds to a masking format;
   determining a privacy status of a user of the electronic device by processing one or more physical aspects of the surrounding environment of the user, wherein the one or more physical aspects of the surrounding environment comprise at least presence of one or more people separate from the user, wherein the one or more physical aspects of the surrounding environment are detected via one or more sensors resident on the electronic device, and wherein said processing is carried out by a server; and
   masking the message on the electronic device based on said privacy status, wherein said masking comprises transforming the message into the masking format that corresponds to the message category for the message, wherein the masking format comprises a set of multiple vibration patterns, wherein each of the multiple vibration patterns comprises a distinct vibration frequency value measured in hertz;
   wherein said receiving, said determining, said mapping, said extracting, and said masking are carried out by a computing device.

2. The method of claim 1, wherein the message comprises one of a text message, an email and a voice message.

3. The method of claim 1, further comprising:
   creating a vocabulary for the masking format; and
   associating each component of the vocabulary with a different message category.

4. The method of claim 1, wherein a message sender defines a message category for the message.

5. The method of claim 1, further comprising:
   enabling a user to change a masking format that corresponds to the message category for the message.

6. The method of claim 1, further comprising:
   monitoring user activity to determine a user state; and
   determining how a message is to be transformed based on the user state and the privacy status.

7. The method of claim 1, wherein extracting the content of the message to generate a message comprises:
   analyzing the content to produce semantics pertaining to the message; and
   using the semantics to generate a category for the message.

8. The method of claim 7, wherein analyzing content comprises using speech recognition.

9. The method of claim 7, wherein using the semantics to generate a category for the message comprises reading a semantic description of the message and mapping the description into a category.

10. The method of claim 1, wherein masking the message on the electronic device by transforming the message into the masking format that corresponds to the message category for the message further comprises:
    sending the masking format to a device membrane component.

11. The method of claim 10, further comprising:
    generating a manifestation according to the masking format for the message.

12. An article of manufacture comprising a computer readable storage memory having computer readable instructions tangibly embodied thereon which, when implemented, cause a computer to carry out a plurality of method steps comprising:
    receiving a message on an electronic device;
    determining if a message category label is included in the message;
    mapping the message category to a corresponding masking format if a message category label is included in the message;
    extracting the content of the message to generate a message category if a message category label is not included in the message, wherein each message category generated corresponds to a masking format;
    determining a privacy status of a user of the electronic device by processing one or more physical aspects of the surrounding environment of the user, wherein the one or more physical aspects of the surrounding environment comprise at least presence of one or more people separate from the user, wherein the one or more physical aspects of the surrounding environment are detected via one or more sensors resident on the electronic device, and wherein said processing is carried out by a server; and masking the message on the electronic device based on said privacy status, wherein said masking comprises transforming the message into the masking format that corresponds to the message category for the message, wherein the masking format comprises a set of multiple vibration patterns, wherein each of the multiple vibration patterns comprises a distinct vibration frequency value measured in hertz.

13. The article of manufacture of claim 12, wherein the message comprises one of a text message, an email and a voice message.

14. The article of manufacture of claim 12, wherein the computer readable instructions which, when implemented, further cause a computer to carry out a method step comprising:

monitoring user activity to determine a user state; and determining how a message is to be transformed based on the user state and the privacy status.

15. The article of manufacture of claim 12, wherein extracting the content of the message to generate a message comprises:

analyzing the content to produce semantics pertaining to the message; and using the semantics to generate a category for the message.

16. The article of manufacture of claim 15, wherein using the semantics to generate a category for the message comprises reading a semantic description of the message and mapping the description into a category.

17. A system for masking a message on an electronic device, comprising:

at least one distinct software module, each distinct software module being embodied on a tangible computer-readable medium;

a memory; and at least one processor coupled to the memory and operative for:

receiving a message on an electronic device;

determining if a message category label is included in the message;

mapping the message category to a corresponding masking format if a message category label is included in the message;

extracting the content of the message to generate a message category if a message category label is not included in the message, wherein each message category generated corresponds to a masking format;

determining a privacy status of a user of the electronic device by processing one or more physical aspects of the surrounding environment of the user, wherein the one or more physical aspects of the surrounding environment comprise at least presence of one or more people separate from the user, wherein the one or more physical aspects of the surrounding environment are detected via one or more sensors resident on the electronic device, and wherein said processing is carried out by a server; and masking the message on the electronic device based on said privacy status, wherein said masking comprises transforming the message into the masking format that corresponds to the message category for the message, wherein the masking format comprises a set of multiple vibration patterns, wherein each of the multiple vibration patterns comprises a distinct vibration frequency value measured in hertz.

18. The system of claim 17, wherein the message comprises one of a text message, an email and a voice message.

19. The system of claim 17, wherein the at least one processor coupled to the memory is further operative for:

monitoring user activity to determine a user state; and determining how a message is to be transformed based on the user state and the privacy status.

20. The system of claim 17, wherein the at least one processor coupled to the memory operative for extracting the content of the message to generate a message is further operative for:

analyzing the content to produce semantics pertaining to the message; and using the semantics to generate a category for the message.

21. The system of claim 20, wherein the at least one processor coupled to the memory operative for using the semantics to generate a category for the message is further operative for reading a semantic description of the message and mapping the description into a category.

* * * * *